(12) United States Patent
Gibson et al.

(10) Patent No.: US 8,943,242 B1
(45) Date of Patent: Jan. 27, 2015

(54) TIMING CONTROLLERS HAVING PARTITIONED PIPELINED DELAY CHAINS THEREIN

(75) Inventors: David Stuart Gibson, Suwanee, GA (US); Bruce Lorenz Chin, Decatur, GA (US)

(73) Assignee: Integrated Device Technology Inc., San Jose, CA (US)

( * ) Notice: Subject to any disclaimer, the term of this patent is extended or adjusted under 35 U.S.C. 154(b) by 334 days.

(21) Appl. No.: 13/436,324

(22) Filed: Mar. 30, 2012

(51) Int. Cl.
*G06F 5/00* (2006.01)

(52) U.S. Cl.
USPC .................................................. 710/60

(58) Field of Classification Search
None
See application file for complete search history.

(56) References Cited

U.S. PATENT DOCUMENTS

| | | | |
|---|---|---|---|
| 6,396,322 B1 * | 5/2002 | Kim et al. ................ | 327/158 |
| 7,079,446 B2 | 7/2006 | Murtagh et al. | |
| 7,134,035 B2 | 11/2006 | Sharma et al. | |
| 7,161,999 B2 | 1/2007 | Parikh | |
| 7,385,861 B1 | 6/2008 | Zhu | |
| 7,665,059 B2 | 2/2010 | Czeck et al. | |
| 7,782,992 B2 | 8/2010 | Nagarajan | |
| 7,904,859 B2 | 3/2011 | Maixner et al. | |
| 7,928,770 B1 | 4/2011 | Bellis et al. | |
| 8,027,420 B2 | 9/2011 | McCabe | |
| 8,205,110 B2 | 6/2012 | Petrick | |
| 8,601,231 B2 * | 12/2013 | Mes ........................ | 711/169 |
| 8,631,220 B2 * | 1/2014 | Smith et al. ............. | 711/167 |
| 2002/0130795 A1 | 9/2002 | Moon | |
| 2003/0117864 A1 | 6/2003 | Hampel et al. | |
| 2003/0122696 A1 | 7/2003 | Johnson et al. | |
| 2004/0105292 A1 | 6/2004 | Matsui | |
| 2004/0236877 A1 | 11/2004 | Burton | |
| 2007/0058478 A1 | 3/2007 | Murayama | |
| 2007/0064846 A1 | 3/2007 | Angel et al. | |
| 2010/0073060 A1 | 3/2010 | Nguyen | |
| 2011/0175654 A1 | 7/2011 | Lee | |

* cited by examiner

*Primary Examiner* — Henry Tsai
*Assistant Examiner* — Juanito Borromeo
(74) *Attorney, Agent, or Firm* — Myers Bigel, et al.

(57) ABSTRACT

A timing controller includes a pipelined delay chain configured to process commands and control signals associated with the commands between a first device and a plurality of second devices having different timing requirements. The pipelined delay chain includes a cascaded arrangement of a primary delay chain, at least one secondary delay chain and a plurality of control signal sequence generators responsive to signals generated by the at least one secondary delay chain. The primary delay chain may include a plurality of serially-linked registers configured to support a pipelining of the commands and a stack configured to support operations to push and pop the control signals associated with the commands to and from the stack.

12 Claims, 4 Drawing Sheets ated with the commands to and from the stack. These primary and secondary delay chains may be programmable in some embodiments of the invention so that delay partitioning between the primary and second delay chains may be easily adjusted. The stack may also be a first-in first-out (FIFO) buffer, which is configured to pop control signals associated with a first command from the stack in-sync with an exiting of the first command from the primary delay chain.
TIMING CONTROLLERS HAVING PARTITIONED PIPELINED DELAY CHAINS THEREIN

FIELD OF THE INVENTION

The present invention relates to integrated circuit devices and, more particularly, to integrated circuit devices used to control timing of data and control signals between source and target devices.

BACKGROUND OF THE INVENTION

In conventional memory buffers, such as DDR3-compatible memory buffers, write and read commands may be spaced a minimum of four cycles apart while the data associated with these commands may be delayed as many as 40 cycles. The command and accompanying control data such as burst length and training parameters must therefore be delayed a corresponding amount of time. One conventional technique to delay command and control data is to use respective pipelines for the signals being delayed. Unfortunately, the use of such pipelines to control the timing of a relatively large number of signals may require an excessive amount of layout area to implement and may not efficiently support variable timing that may be command specific. Moreover, in some memory buffer designs, relatively slower signals are frequently generated in response to relatively faster signals, which can be a problem when the timing of the relatively faster signals is changed. Accordingly, it would be advantageous to provide a greater degree of independent control between signals having different timing requirements.

SUMMARY OF THE INVENTION

A timing controller according to embodiments of the invention can include a pipelined delay chain configured to process commands and control signals associated with the commands between a first device and a plurality of second devices having different timing requirements relative to the first device and each other. The pipelined delay chain can include a cascaded arrangement of a primary delay chain, at least one secondary delay chain and a plurality of control signal sequence generators responsive to signals generated by the at least one secondary delay chain. The primary delay chain can include a plurality of serially-linked registers, which are configured to support a pipelining of the commands, and a primary data stack. This primary data stack may operate as a buffer that supports operations to push and pop the control signals associated with the commands to and from the primary data stack.

According to additional embodiments of the invention, the primary delay chain and the at least one secondary delay chain may be configured to provide programmable delays that may be adjustably partitioned between the primary and secondary stages. In addition, each of the plurality of control signal sequence generators may also be configured to provide a respective delay that is programmable. According to further embodiments of the invention, the primary data stack can be a first-in first-out (FIFO) buffer configured to pop control signals associated with a first command from the primary data stack in-sync with an exiting of the first command from the primary delay chain. Moreover, the plurality of control signal sequence generators may be configured to generate a plurality of pulses having unique timing and duration. The at least one secondary delay chain may also include at least one secondary data stack configured to receive control signals from the primary data stack or from predetermined values returned from a local look-up table based on indicator information contained in the stack.

According to further embodiments of the invention, a timing controller is configured to include a pipelined delay chain, which is configured to process commands and control signals associated with the commands between a first device and a plurality of second devices having different timing requirements. The pipelined delay chain can include a cascaded arrangement of a primary delay chain and at least one secondary delay chain. This primary delay chain can include a plurality of serially-linked registers configured to support a pipelining of the commands and a stack configured to support operations to push and pop the control signals associ- According to still further embodiments of the invention, a timing controller within a memory buffer may include a pipelined delay chain configured to process commands and control signals associated with writing and reading data to and from a plurality of memory devices coupled to the controller. The pipelined delay chain includes a cascaded arrangement of a primary delay chain, at least one secondary delay chain and a plurality of control signal sequence generators responsive to signals generated by the at least one secondary delay chain. The primary delay chain can include a plurality of serially-linked registers configured to support a pipeline of read/write commands and a stack configured to support operations to push and pop the control signals associated with the read/write commands to and from the stack. In particular, the primary delay chain can be configured to pop first control signals associated with a first read/write command from the stack in response to passing of the first read/write command through the primary delay chain. These first control signals may include first command type and first rank information associated with a first of the memory devices. In addition, the at least one secondary delay chain can be configured to independently delay at least four timing signals associated with an input clock, input data, an output clock and output data associated with the first command type and first rank information.

DETAILED DESCRIPTION OF EMBODIMENTS

Figure 1A:
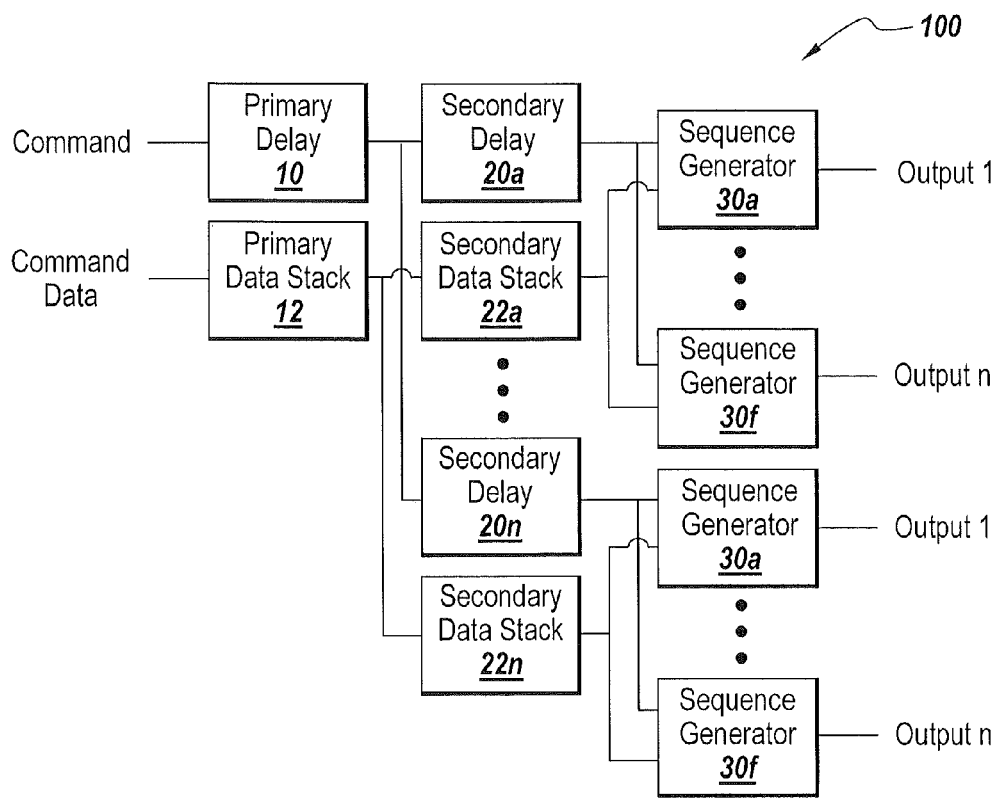
FIG. 1A is a block diagram of a timing controller according to some embodiments of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer (and variants thereof), it can be directly on, connected or coupled to the other element or layer or intervening elements or layers may be present. In contrast, when an element is referred to as being "directly on," "directly connected to" or "directly coupled to" another element or layer (and variants thereof), there are no intervening elements or layers present. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention will now be described with respect to FIGS. 1A-1B. As shown by FIG. 1A, a timing controller 100 within a memory buffer can include a pipelined delay chain configured to process commands and control signals, which are associated with writing and reading data to and from a plurality of memory devices coupled to the controller 100. These memory devices may be dynamic random access memory (DRAM) devices arrayed on a dual in-line memory module (DIMM) or board, for example. The pipelined delay chain is shown as including a cascaded arrangement of a primary delay chain 10, 12 at least one secondary delay chain (20a, . . . , 20n; 22a, . . . , 22n) and a plurality of control signal sequence generators (30a, . . . , 30f) responsive to signals generated by the at least one secondary delay chain. The primary delay chain may be configured as a plurality of serially-linked registers 10, which are configured to support a pipeline of read/write commands, and a stack 12 (e.g., FIFO) configured to support operations to push and pop control signals associated with the read/write commands to and from the stack 12. As will be understood by those skilled in the art, a command may either be a write command (W) having a corresponding write latency (WL) or a read command (R) having a corresponding read latency (RL). Accompanying each command may be an indication of a burst length, which may be expressed as a single bit to designate either a first burst length (e.g., 4) or a second burst length (e.g., 8). Also accompanying each command may be a designation of the rank of a memory (e.g., DRAM) being accessed in response to the command, which may be a function of, among other things, the location of a memory device on a module or board. As will be understood by those skilled in the art, each memory rank may have unique read and write timing parameters that are used to control a receiver sequence associated with a memory read command or a transmitter sequence associated with a memory write command. These timing parameters may have a coarse component, which may be expressed in clock cycles, and a fine component, which may be expressed in fractions (e.g., 64ths) of a clock cycle.

When the controller 100 is used within a memory buffer, the timing may be controlled on four interfaces: host upper nibble (HUN), host lower nibble (HLN), DRAM upper nibble (DUN) and DRAM lower nibble (DLN). Each of these four interfaces may have a unique set of two timing parameters (e.g., one set to control the DQ pins and one set to control the DQS/DQS# pins). According to some embodiments of the invention, the primary delay stage 10 receives the command (R or W) into a delay element, which may provide a delay equivalent to either RL-n or WL-n, where "n" is an integer (e.g., n=5), RL is a read latency associated with a read command and WL is a write latency associated with a write command. In particular, the delay provided by the primary delay stage 10 may be set to a value that allows for preparatory actions to be undertaken in response to the commands. At the same time that the command enters a primary delay element, the command type (R or W), burst length and rank information are stored in a stack 12, which may be configured as a W-bit wide and D-words deep shift register, which supports push, pop and clear functions in a first-in first-out manner.

When the command exits the delay element, the command type, burst length and rank information are popped off the stack 12 and provided to an appropriate secondary stack (22a-22n). The command type and rank information are then used to access the timing parameters for the four interfaces under control (i.e., host upper and lower nibbles and DRAM upper and lower nibbles). The secondary delay stage 20a-20n then receives the command and delays it according to the coarse delay in the timing parameters. According to some embodiments of the invention, there can be 14 secondary delay stages, however a reduced number of programmable delay stages with multiple taps can be used as explained more fully hereinbelow. For example, the secondary delay stages 20a-20n can include four (4) for a lower nibble read controller (input clock, input data, output clock and output data delay stages) and four (4) for an upper nibble read controller and a reduced number of three (3) for a lower nibble write controller and three (3) for an upper nibble write controller, because the DQ and DQS pins can have the same timing during write operations. Advantageously, by sharing the first primary delay stage 10 among all 14 secondary delay stages 20a-20n, 13·N registers can be saved, where N is the length of the primary delay stage. The third stage includes sequence generators 30a-30f, which generate control signals of an appropriate delay and duration to operate the interfaces (e.g., DDR interfaces). Moreover, by sharing the first two stages among multiple sequence generators, more substantial reductions in the number of required registers can be achieved.

Figure 1B:
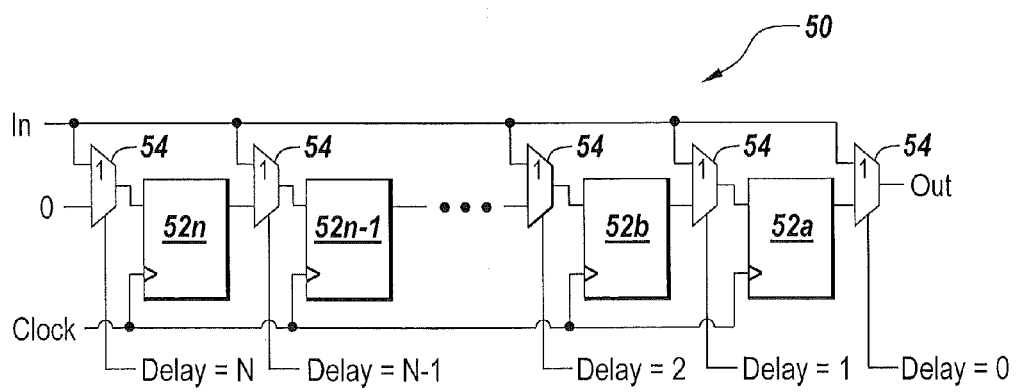
FIG. 1B is a block diagram of a pipeline containing serially-linked registers (e.g., D-type flip flops) that may be used in the timing controller of FIG. 1A.

As illustrated by FIG. 1B, a delay stage may be embodied as a pipeline 50 containing serially-linked registers 52a-52n (e.g., D-type flip flops) with a fixed output register and a variable input register controlled by multiplexers 54. In response to each clock, data moves from one register in the pipeline 50 to a subsequent register until it appears at an output where it is either acted upon or passed to another delay element. As illustrated, each register may take its input from the previous stage in the pipeline 50 or the primary input (IN) of the delay element. As will be understood by those skilled in the art, if the delay required is N clock cycles, the Nth pipeline register from the output can be used to capture an input command. However, if N is 0, the output itself becomes the input to the delay chain and the delay chain is bypassed. A stack within the embodiment of FIG. 1A may be embodied as a shift register W bits wide and D words deep, which may support push, pop and clear operations in a first-in first-out manner.

Figure 2A:
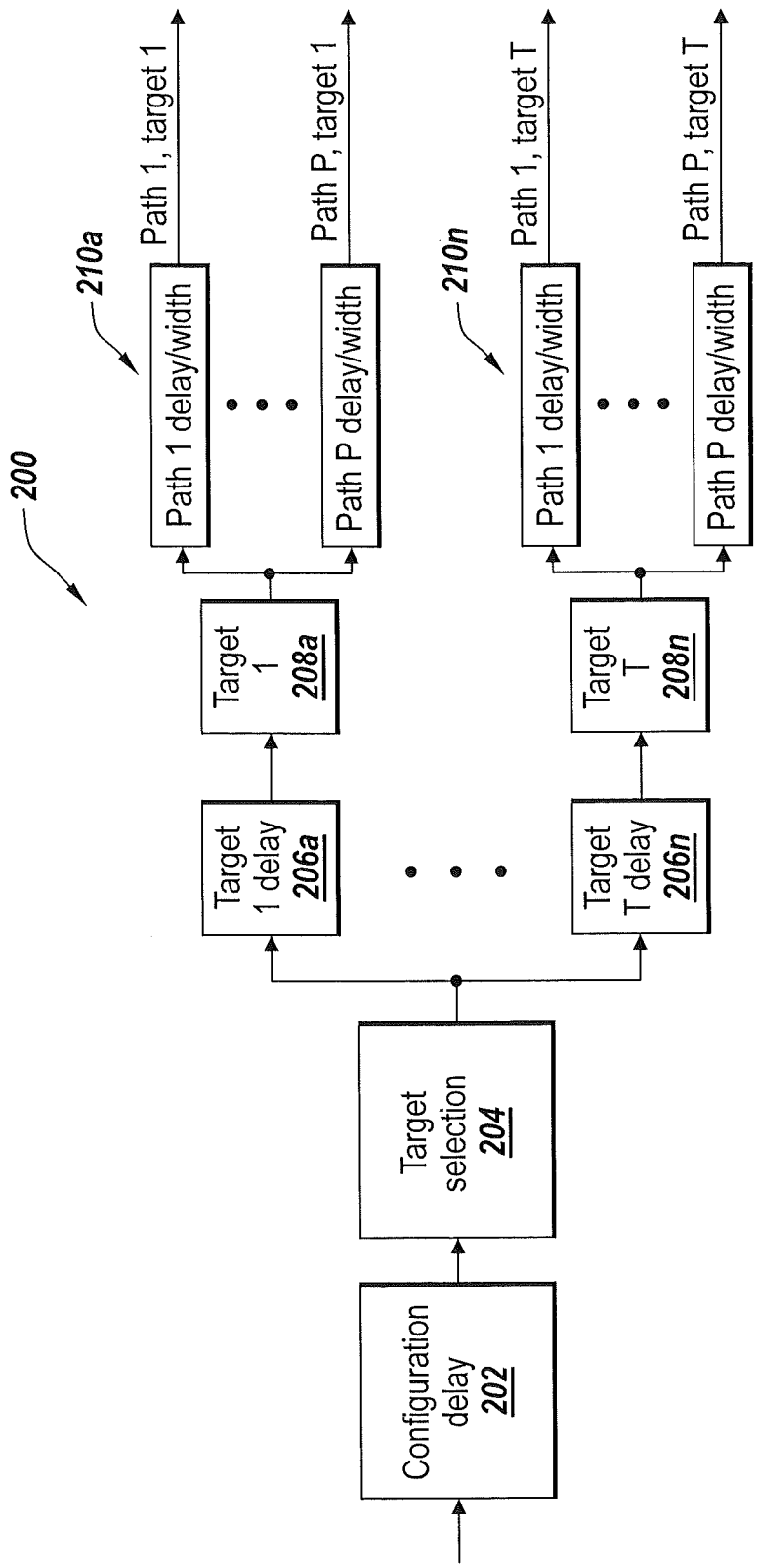
FIG. 2A is a block diagram of a timing controller and pipelined signal generator according to embodiments of the invention.

FIG. 2A illustrates a timing controller and pipelined signal generator 200 according to additional embodiments of the invention. As shown by FIG. 2A, a timing controller 200 can include a pipeline containing configuration, target and path specific delay elements. The configuration delay element and stack 202 and target selection circuitry 204 may provide a programmable primary delay to received commands and accompanying control signals based on a selected configuration between a source device (e.g., host controller) and a desired target device (e.g., DRAM device 1, . . . , T). A plurality of target specific delay elements 206a-206n are provided as secondary delay elements, which may provide programmable delays to command and control signals received from the primary delay chain. Target specific blocks 208a-208n receive an input timing signal(s) and initiate the generation of signals that comprise the plurality of distinct path signals. These target specific blocks 208a-208n may contain respective secondary data stacks, as illustrated by FIG. 1A, and may use the path-specific information contained in the stacks or recovered from previously stored tables using indicators contained in the stacks to initiate generation of respective path signal(s) (Path 1, . . . , P) having appropriate delays and pulse widths via the path/target specific sequence generators 210a-210n.

Figure 2B:
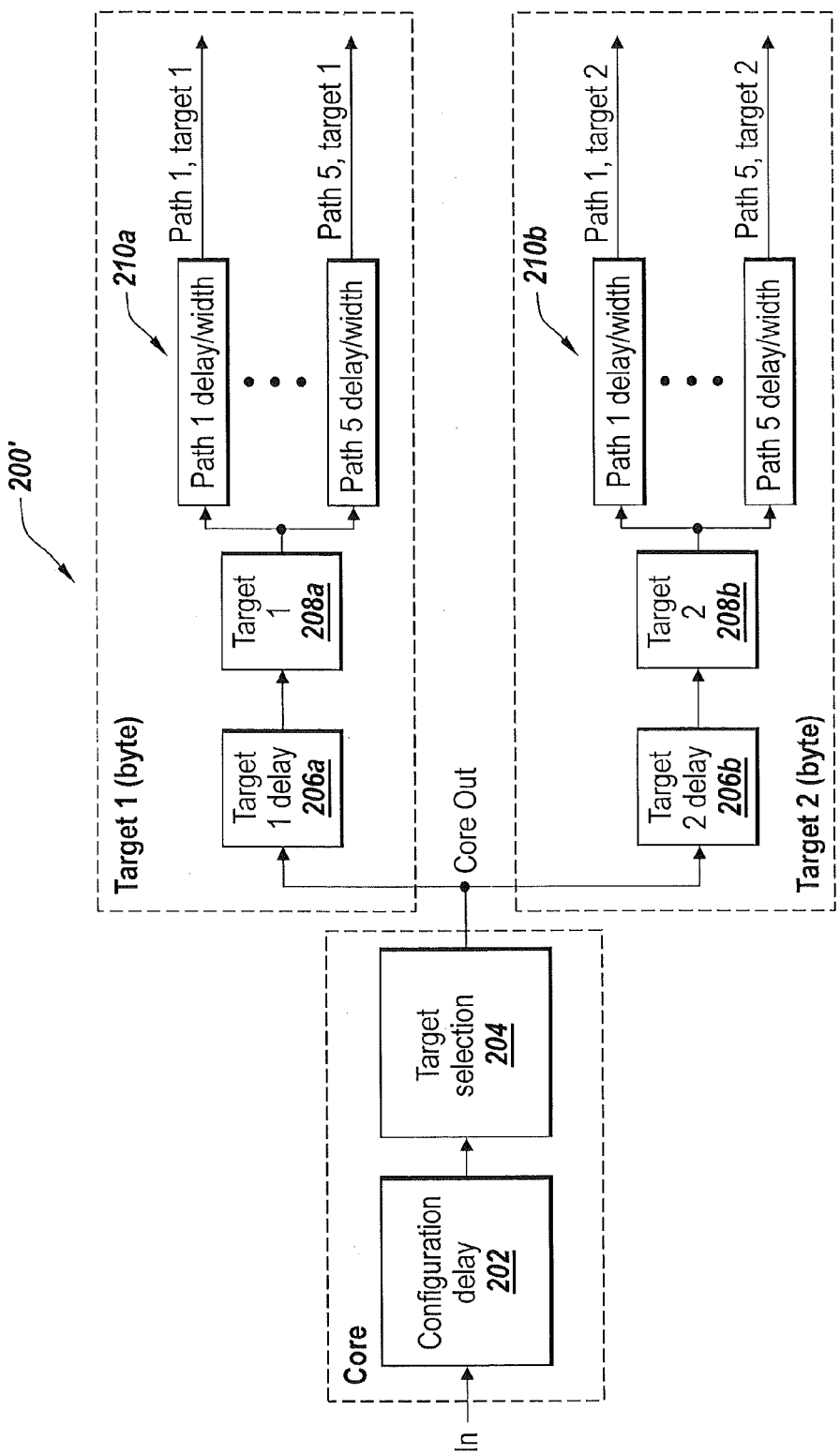
FIG. 2B is a block diagram of a timing controller and pipelined signal generator according to embodiments of the invention.

FIG. 2B illustrates an exemplary timing controller and pipelined signal generator 200' under conditions where the total delays from the input (IN) to Path X, target 1 are (6,6,7, 6,7) clock cycles and the total delays from the input (IN) to Path X, target 2 are (12,11,12,12,11). This example illustrates an absolute delay variance from 6 to 12 across the two targets (e.g., two memory devices of unequal rank), but with a delay variance of only one (1) between the control signals for a given target. Accordingly, if a primary delay of 3 is provided, secondary delays of (3,3,4,3,4) and (9,8,9,9,8) will be needed. However, if three additional cycles of secondary delay are pulled into the programmable primary delay, secondary delays of only (0,0,1,0,1) and (6,5,6,6,5) will be needed. This pulls three registers out of the secondary delay path (which is replicated 5 times) and puts them into the primary delay patent (which is replicated only once), thereby reducing the total number of necessary delay stages from 3(1)+9(5*2)=93 to 3(1)+3(1)+6(5*2)=66, which can be achieved merely by reapportioning of delay between the primary and secondary delay elements based on training results. Referring again to FIG. 2A, the above numerical example illustrates that whenever all target delays are greater than X, the delay of X may be substracted from every target delay and added to the configuration delay. Similarly, if all path delays associated with a target are greater than X, then the delay of X may be subtracted from every path delay and added to the target delay. Finally, if the path and target delays are all greater than X, then the delay of X may be subtracted from some combination of path and target delays and added to the configuration delay.

According to still further embodiments of the invention, the embodiments of FIGS. 1A-1B and 2A-2B may be replaced by a "long" shift register (LSR) containing a primary shift register (PSR) cascaded with a secondary shift register (SSR). According to these embodiments, a division in delay between the PSR and SSR may be changed dynamically by providing a signal to an input port of the PSR and tapping different output ports within the LSR. This providing of a signal (e.g., command) to the input port may be performed concurrently with the loading of control information onto a primary data stack (see, e.g., FIG. 1A). This control information tells the design, among other things, how long the PSR should be for a corresponding operation and also configures the design to monitor a particular shift register port to identify when the command is passing from the PSR to the SSR. When the command reaches the SSR, the appropriate delay values for command can be used to program a demultiplexer (DEMUX) to identify which tap is to be selected as the path output. This programmed DEMUX configuration can remain until the next command reaches the end of its PSR and changes the DEMUX settings. This DEMUX program information may be stored in the equivalent of the secondary data stack. One implementation of this has each DEMUX replacing each target branch (see, e.g., FIG. 2A). Of course, the input signals must be spaced sufficiently to insure that all signals generated by a single command have been transmitted before the next command exits the PSR and reprograms the DEMUX. Alternatively, the LSR may have multiple parallel paths branching out, with each path accounting for common delays. As long as each path never has outputs that overlap in time, the inputs may be spaced closer together. These implementations may utilize one DEMUX per path or may use a tree of DEMUXs to minimize logic, where the tree performs the functionality of the target and path delays described with respect to FIGS. 2A-2B.

Figure 3:
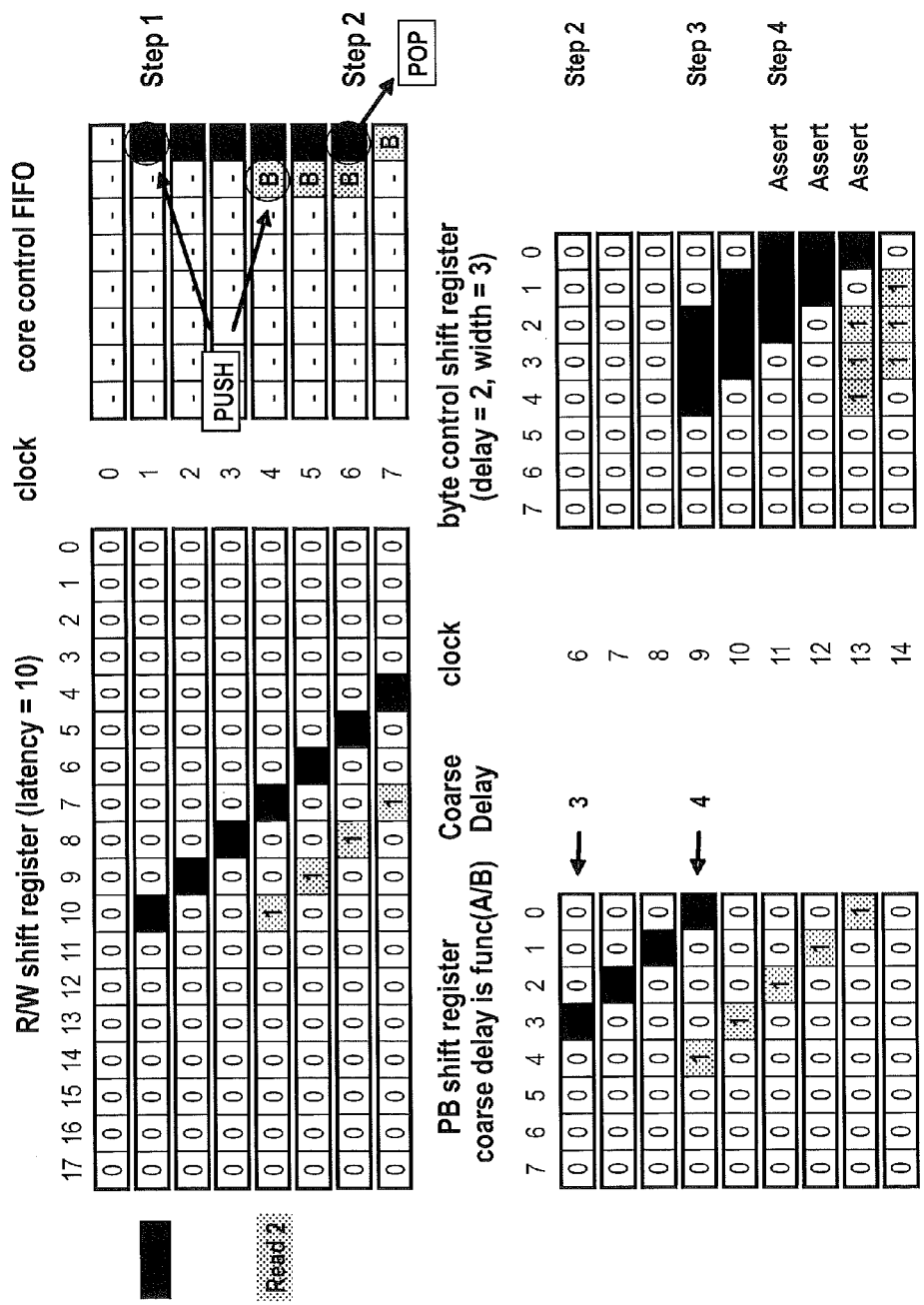
FIG. 3 is a schematic diagram that illustrates operations performed by timing controllers according to some embodiments of the invention.

FIG. 3 is a schematic diagram that illustrates operations performed by timing controllers according to some embodiments of the invention. As shown by FIG. 3, a sequence of read commands (Read1, Read2) and corresponding core control signals (A, B) may be received into a primary 18-bit shift register and pushed onto a core control FIFO during clock cycles 1 and 4. Delay element 10 within the shift register is set to a logic 1 value during cycles 1 and 4 based on a read latency (RL) of 10. As shown by the FIFO, a pop operation is performed to acquire the core control signals (e.g., command type, burst length and rank, etc.) associated with the first read command (Read1) at clock cycle 6, which corresponds to when the logic 1 value within the shift register has been moved to bit location 5 (e.g., RL-5). As shown by the logic 1 entries into the PB shift register at clock cycles 6 and 9, the core controls signals associated with the first and second read commands are used to specify corresponding rank-specific coarse delays of 3 (for Read1) and 4 (for Read2). As shown by movement of the logic 1 entries into bit position 0 of the PB shift register at clock cycles 9 and 13, each "byte" control shift register is loaded with a specific delay and pulse width indicator (shown as cycles wide) to generate the appropriate path-specific control signals. Thus, as illustrated beginning at clock cycle 11, a 3-cycle wide pulse is asserted during cycles 11-13.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A timing controller, comprising:
a pipelined delay chain configured to process commands and control signals associated with the commands between a first device and a plurality of second devices having different timing requirements, said pipelined delay chain comprising a cascaded arrangement of a primary delay chain, at least one secondary delay chain and a plurality of control signal sequence generators responsive to signals generated by the at least one secondary delay chain, said primary delay chain comprising a plurality of serially-linked registers configured to support a pipelining of the commands and a primary delay stack configured to support operations to push and pop the control signals associated with the commands to and from the primary data stack;
wherein said primary delay chain is configured to pop first control signals associated with a first command from the primary data stack in response to passing the first command through the primary delay chain;
wherein the first control signals include information identifying the first command and timing related information associated with a first of the plurality of second devices; and
wherein the at least one secondary delay chain is configured to independently delay signals associated with at least a first clock and at least first data based on timing parameters associated with the first command and the timing related information associated with the first of the plurality of second devices.

2. The timing controller of claim 1, wherein the primary delay chain is configured to provide a programmable delay.

3. The timing controller of claim 2, wherein the at least one secondary delay chain is configured to provide a programmable delay.

4. The timing controller of claim 3, wherein each of the plurality of control signal sequence generators is configured to provide a programmable delay.

5. The timing controller of claim 1, wherein the primary data stack is a first-in first-out (FIFO) buffer configured to pop control signals associated with a first command from the primary data stack in-sync with an exiting of the first command from the primary delay chain.

6. The timing controller of claim 1, wherein the plurality of control signal sequence generators generate a plurality of pulses having unique timing and duration.

7. The timing controller of claim 6, wherein the at least one secondary delay chain comprises at least one secondary data stack configured to receive control signals from the primary data stack.

8. A timing controller, comprising:
a pipelined delay chain configured to process commands and control signals associated with the commands between a first device and a plurality of second devices having different timing requirements, said pipelined delay chain comprising a cascaded arrangement of a primary delay chain and at least one secondary delay chain, said primary delay chain comprising a plurality of serially-linked registers configured to support a pipelining of the commands and a stack configured to support operations to push and pop the control signals associated with the commands to and from the stack;
wherein said primary delay chain is configured to pop first control signals associated with a first command from the stack in response to passing the first command through the primary delay chain;
wherein the first control signals include information identifying the first command and timing related information associated with a first of the plurality of second devices; and
wherein the at least one secondary delay chain is configured to independently delay signals associated with at least a first clock and at least first data based on timing parameters associated with the first command and the timing related information associated with the first of the plurality of second devices.

9. The timing controller of claim 8, wherein the primary delay chain is configured to provide a programmable delay.

10. The timing controller of claim 9, wherein the at least one secondary delay chain is configured to provide a programmable delay.

11. The timing controller of claim 8, wherein the stack is a first-in first-out (FIFO) buffer configured to pop control signals associated with a first command from the stack in-sync with an exiting of the first command from the primary delay chain.

12. A timing controller, comprising:
a pipelined delay chain configured to process commands and control signals associated with writing and reading data to and from a plurality of memory devices, said pipelined delay chain comprising a cascaded arrangement of a primary delay chain, at least one secondary delay chain and a plurality of control signal sequence generators responsive to signals generated by the at least one secondary delay chain, said primary delay chain comprising a plurality of serially-linked registers configured to support a pipeline of read/write commands and a stack configured to support operations to push and pop the control signals associated with the read/write commands to and from the stack;
wherein said primary delay chain is configured to pop first control signals associated with a first read/write command from the stack in response to passing of the first read/write command through the primary delay chain;
wherein the first control signals include first command type and first rank information associated with a first of the memory devices; and
wherein the at least one secondary delay chain is configured to independently delay at least four timing signals associated with an input clock, input data, an output clock and output data based on timing parameters associated with the first command type and first rank information.

* * * * *